9703X
E. Whitfield,
Pump Bellows
Patented June 2, 1836.
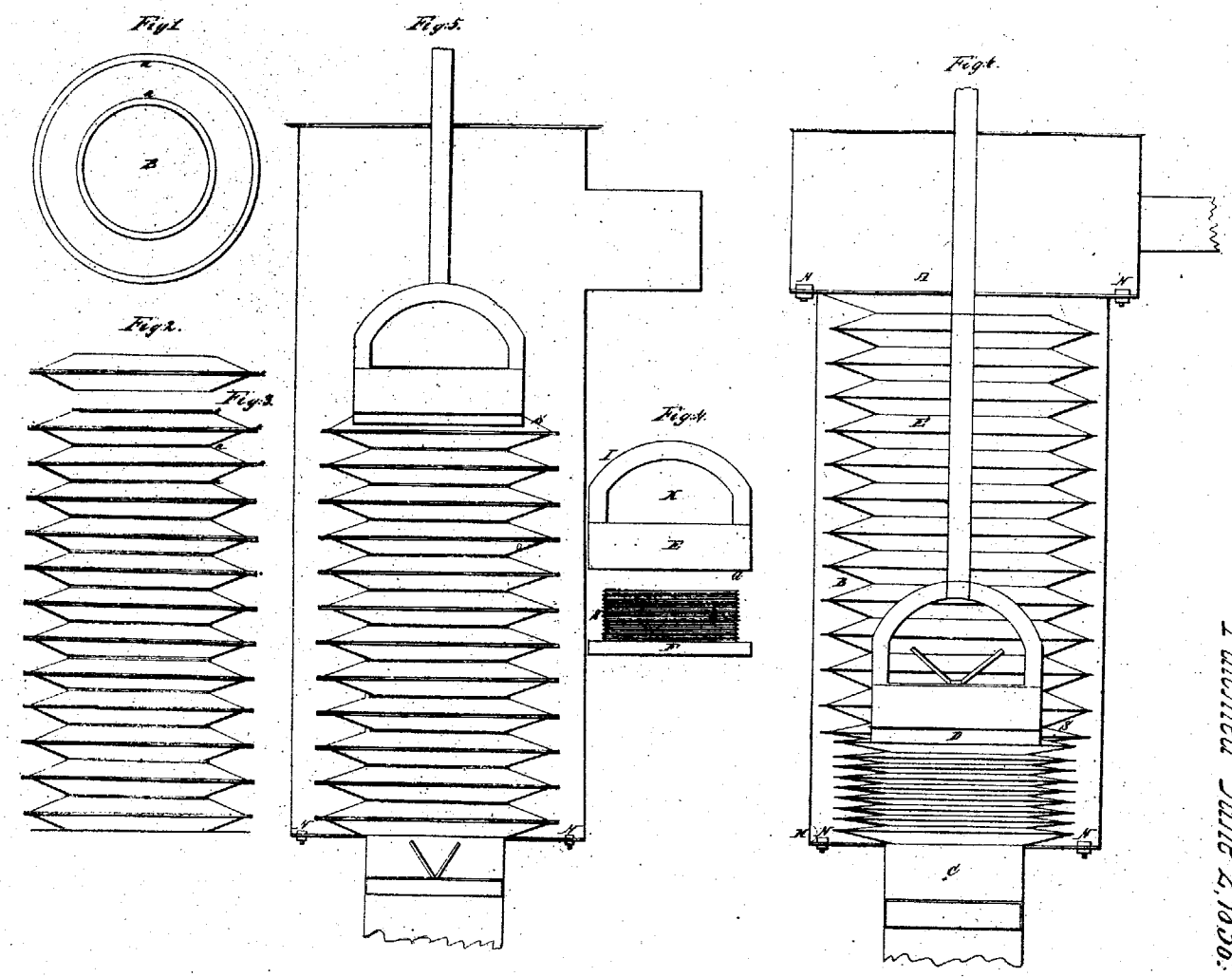

Edward Whitfield, of New York 9703X
Letters Patent

The schedule referred to in these Letters Patent and making part of the same, containing a description in the words of the said Edward Whitfield himself, of his Improvement in the frictionless Pump.

To all to whom these presents shall come: Be it known that I Edward Whitfield of the City, County, and State of New York have invented new and useful improvements in the frictionless Pump, which improvements are applicable to all purposes in practical Hydraulics and Pneumatics, and that the following is a full and exact description thereof. For the more clearly illustrating these improvements, I have hereto appended several drawings exhibiting the said improvements in different positions, with the formation of the different parts of the connectors, Pump barrels &c. Figure 1. This figure is intended to represent a Top view of a circular piece of leather, or of canvass, or of any other suitable material made water tight, and having a round hole cut in the centre of such circular piece of leather, canvass, or any other suitable material for the passage of the water as at B. equal to the diameter of the valve intended to be used. a.a. are intended to represent the stitches which appear when two of the aforesaid circular pieces are sewed together.
Figure 2. This figure is intended to represent the first pair of the aforesaid circular pieces of leather, or of canvass, or of any other suitable material, as described in figure 1. sewed together at their outer edges with a welt between them as at a.a. Figure 3. This figure is intended to represent a connector of twelve pairs, or chambers completed, and stretched out to its full extent a.a.a.a. represent the stitches and welts between. By uniting any required number of the above described circular pieces of leather, or of canvass, or of any other suitable material made water tight the connector may be made of any length or dip required. Figure 4. This figure is intended to represent a strong Metallic box composed of two divisions which are subsequently united by forming the two uniting parts into a screw as at d. E. is the upper division and F. the lower division. G. is the space to admit the upper and inner rim of the connector, which is afterwards securely fixed in its situation by means
of the screw S.. I is the cradle to which the piston rod is fastened. and K. is
the space of the valves – Figure 5. This figure is intended to represent a section
of the pump, with the connector in its upward position, secured at its inner and
upper rim to the metallic box, by means of the screw S. and at its lower and
outer rim between the flanges of the barrel by means of nuts and screws.
Figure 6. This figure is intended to represent a section of the pump with the
cylinder made in three pieces – A. is the upper portion or reservoir – B. the
middle portion or working barrel and C. the lower portion or feed pipe –
The piston and bucket are represented in the downward position as well
as the lower connector C. an upper or additional connector D. is secured at
its upper rim between the flanges of the working barrel, and the reservoir by
means of screws and nuts N.N. and at its lower and inner rim to the metal-
lic piston box by means of the screw S – The upper connector may be removed
or attached when required – The letter H. is intended to represent an opening
at the bottom of the working barrel, which will serve the double purpose of
admitting the air between the sides of the cylinder and the connectors, and of
allowing a passage for the escape of any water which might by possibility
be forced through the connectors – A stop cook may be fitted to this hole H.
if found requisite, and when the stop cock is closed, and the upper connector remo-
ved the pump may be worked in the same simple manner as described and rep-
resented in Figure 5. of the accompanying drawing.
This pump may be also made to operate without a working barrel thus – instead of
a cylinder for the working barrel I would unite the reservoir and feed pipe C.
by means of three or more upright pillars or rods secured to the flanges of
the reservoir and to the flanges of the feed pipe by means of screws and nuts.
in the same manner as is the working barrel represented in figures 5 and 6 –
By this means the exterior part of the connectors is made to operate freely
in the open air – What I claim as my own invention and not previously
known in the above described pump is the particular manner of forming
or constructing the part called the connector, by taking circular pieces of
leather, canvass, felt, or of any other suitable material made water tight
which circular pieces have circular openings in their centres as shewn in figure 1. in the accompanying drawing, and uniting any required number
of them, by sewing, or cementing, or fastening them together in the manner
described; by which means this part of the apparatus is rendered stronger and
its action more perfect than by any of the methods hitherto adapted—
And I also claim the particular manner of attaching an additional con-
nector to the pump, between the flanges of the reservoir, and the flanges of
the working barrel by means of screws and nuts, and to the metallic pis-
ton box, by means of the screw S. in the same manner as described in figure
6 of the accompanying drawing, by which additional connector so attached,
the working barrel of the pump is kept free from sand, soil or any other sub-
stance, or by substituting upright pillars or rods for a working barrel, the
connectors are made to operate more freely, and with less friction, than
by any of the methods hitherto known or used.

Witnesses
John Johnson
W. P. Brayton

Ed. Whitfield
New York 2d. April 1836

Drawing

[107 8 11 82]

Exd
[illegible]